Dec. 10, 1935. T. H. LIEBLER 2,023,600
WINDSHIELD HEATER
Filed Oct. 26, 1934
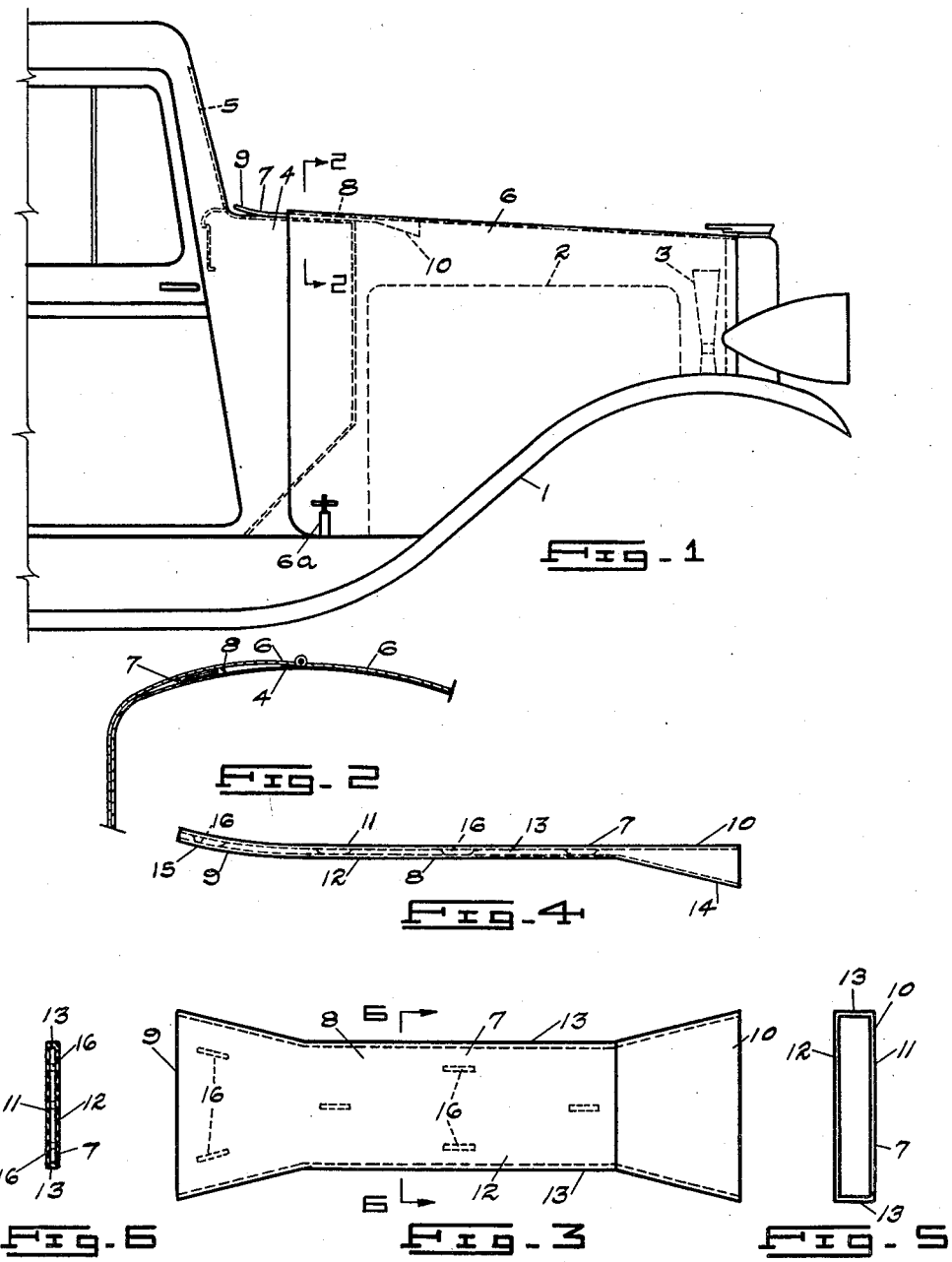
INVENTOR
Theodore H. Liebler.
BY George F. Vaia.
ATTORNEY Patented Dec. 10, 1935

2,023,600

UNITED STATES PATENT OFFICE 2,023,600

WINDSHIELD HEATER

Theodore H. Liebler, Butler, Pa., assignor of one-third to William C. Campbell and one-third to John D. Clark, Butler, Pa.

Application October 26, 1934, Serial No. 750,156

7 Claims. (Cl. 20—40.5)

The invention pertains to conveyers adapted to be used in connection with motor vehicles and particularly to a device suitable for directing a column of heated air, from a location beneath the hood, upon the outer surface of the windshield in order to prevent ice and snow from adhering to the windshield and obscuring the roadway from the vision of the operator.

During the winter months, transportation, by means of motor vehicle, is hampered by the accumulation of ice and snow on the outer surface of the windshield. It has been the usual practice heretofore, to employ a blade, operated by a suitable mechanism, to clear an opening through the snow on the outer surface of the windshield to permit the operator of the vehicle to see the roadway ahead. Whilst the blade is in common usage, it has proven very unsatisfactory inasmuch as the snow, in severe cold weather, forms particles of ice on the windshield which the blade, due to its formation, fails to remove. A further disadvantage in using the blade alone is that the snow, in being swept aside to provide an opening has a tendency to pack, which necessitates the operator to stop the vehicle and remove the accumulated snow.

With the foregoing in mind it is therefore an object of the present invention to provide means for preventing ice and snow from accumulating on the outer surface of the windshield.

Another object of the invention is the provision of a conveyer adapted to transmit a column of heated air given off by a motor unit to a location adjacent the lower portion of the windshield.

A further object of the invention lies in the novel construction of the conveyer and its use with a motor vehicle in order that it may be easily applied and removed.

Other objects will become apparent to those skilled in the art from the succeeding description together with the accompanying drawing which forms a part of the present description, in which Figure 1 shows a fragmentary side elevation of a motor vehicle.

Figure 2 shows a fragmentary sectional view taken along the lines 2—2 of Figure 1.

Figure 3 shows an enlarged plan view of the conveyer employed to transmit heated air to the outer surface of the windshield.

Figure 4 shows a side elevation of the conveyer shown in Figure 3.

Figure 5 shows an end view of the conveyer shown in Figure 3.

Figure 6 shows a sectional view taken along the lines 6—6 of Figure 3.

Referring now in detail to the drawing wherein like reference characters refer to like parts the reference character 1 designates a motor vehicle having the usual motor unit 2, employed as a propelling means for the vehicle, and a radiator cooling fan 3. Extending transversely of the motor vehicle, adjacent the rear portion of the motor unit 2, is a cowl 4 having the usual windshield 5 extending upwardly from adjacent the rear edge thereof. Hinged adjacent the longitudinal center of the motor vehicle and extending outwardly beyond the front portion of the cowl 4 is the usual hood 6 in spaced relation to the motor unit 2 and the radiator cooling fan 3. The hood 6 is held in position by releasable clamps 6a.

The conveyer 7 (Figures 3 to 6 both inclusive) comprises an intermediate portion 8 and flared end portions 9 and 10 respectively. The conveyer is integrally formed of vertically spaced top and bottom walls 11 and 12 respectively and laterally spaced side walls 13 which are preferably of greater thickness than the top wall 11 and bottom wall 12. The top wall 11 and the bottom wall 12 are parallel throughout the intermediate portion 8 and the end portion 9 while the bottom wall 12 in the end portion 10 extends downwardly, as at 14, at an angle to the plane of the top wall 11 in order that the end portion 10 may arrest a considerable amount of heated air given off by the motor unit 2. The end portion 9 is arcuated, as at 15, for the purpose of directing the heated air in a vertical direction across the outer surface of the windshield 5. Spaced at intervals longitudinally of the conveyer are posts 16 adapted to space the top and bottom walls apart thereby preserving a free passageway throughout the conveyer. The posts are preferably secured to the top wall 11 and are of such height so as to abut the bottom wall 12 in order to permit the conveyer to conform to any radii of hood and cowl without buckling and thereby closing the free passage of air through the conveyer.

It will be noted that the flared end portion 10 materially assists in enlarging the area of the end portion 10 thereby being adapted to direct a considerable amount of heated air through the intermediate portion 8 and end portion 9 and consequently to the lower portion of the windshield 5. By flaring the end portion 9 an appreciable wide path of heated air will be directed across the outer surface of the windshield.

Due to the movement of the hood 6 with respect to the cowl 4, created by the flexibility of a motor vehicle and variations in the roadway, the conveyer is preferably formed of rubber so as to overlie the cowl 4 and insure the highly painted surface of the cowl. It will be noted by those skilled in the art that, by being formed of rubber or any semiflexible material, the conveyer will conform to any radii of hood and cowl.

The operation of the invention is as follows: Assuming the windshield 5 of a motor vehicle is covered with snow and ice and it is desirous of removing it the hood 6 of a motor vehicle is moved to a raised position. The conveyer is then placed upon the cowl 4, preferably in alignment with the steering wheel (not shown) having the end portion 9 in close proximity to the lower portion of the windshield 5 and the end portion 10 projecting outwardly beyond the cowl 4 and overlying the motor unit 2 in spaced relation thereto. The hood is then lowered and secured in position by the releasable clamps 6a thereby securing the conveyer 7 in position between the cowl 4 and hood 6. The relation of the top and bottom walls 11 and 12 respectively extending throughout the conveyer, will not be affected by the pressure of the hood 6 due to the increased thickness of the side walls 13 and the posts 16 maintaining the top wall 11 and bottom wall 12 in fixed relation to each other. The motor unit 2 is then started and it will become apparent to those skilled in the art that the heat given off by the motor unit 2 and driven rearwardly by the radiator cooling fan 3 will be conducted to the windshield by the conveyer 7 and thereby cause any frozen particles adhering to the windshield to become dissolved.

It will, of course, be understood that if so desired a conveyer may be placed on both sides of the longitudinal center of the cowl in order that a column of heated air may be directed to the windshield in order to clear a plurality of openings as the conveyer was shown preferably in alignment with the steering wheel only, merely as a means of exemplification.

Having thus described the invention what I claim as new and desire to secure by Letters Patent is:

1. In a conveyer formed of rubber for heating a windshield, in combination, spaced top and bottom walls, laterally spaced side walls of greater thickness than the top and bottom walls, and means secured to the top wall intermediate the side walls adapted to retain the top and bottom walls in spaced relation.

2. In a conveyer formed of rubber for heating a windshield, in combination, an intermediate portion and flared end portions, said portions comprising spaced top and bottom walls and side walls of greater thickness than the top and bottom walls, and means secured to the top wall intermediate the side walls adapted to space the top and bottom walls apart.

3. In a conveyer formed of rubber for heating a windshield, in combination, an intermediate portion and flared end portions, said portions comprising spaced top and bottom walls and side walls of greater thickness than the top and bottom walls, and means secured to the top wall extending longitudinally of the conveyer intermediate the side walls adapted to retain the top and bottom walls in spaced relation.

4. In a conveyer formed of rubber for heating a windshield, in combination, spaced top and bottom walls, laterally spaced side walls of greater thickness than the top and bottom walls, and longitudinally disposed posts secured to the top wall adapted to retain the top and bottom walls in spaced relation.

5. In a conveyer for heating a windshield, in combination, an intermediate portion, a flared portion secured to one end of the intermediate portion and an arcuate portion secured to the other end of the intermediate portion, said intermediate, flared and arcuate portions being formed of rubber and comprising spaced top and bottom walls, laterally spaced side walls of greater thickness than the top and bottom walls and means secured to the top wall intermediate the side walls adapted to retain the top and bottom walls in spaced relation.

6. In a conveyer formed of rubber for heating a windshield, in combination, vertically spaced top and bottom walls, laterally spaced side walls of greater thickness than and connecting the top and bottom walls and means secured to the top wall extending longitudinally of the conveyer intermediate the side walls adapted to retain the top and bottom walls in spaced relation.

7. In a converter formed of rubber for heating a windshield, removably secured between the hood and cowl of an automobile, in combination, spaced top and bottom walls, laterally spaced side walls of greater thickness than the top and bottom walls, and posts secured to the top wall intermediate the side walls adapted to retain the top and bottom walls in spaced relation.

THEODORE H. LIEBLER.